(12) United States Patent
Mulder

(10) Patent No.: US 8,371,434 B2
(45) Date of Patent: Feb. 12, 2013

(54) CONVEYOR ASSEMBLY

(75) Inventor: Henry C. Mulder, Zeeland, MI (US)

(73) Assignee: Balanced Enterprise Solutions, LLC, Holland, MI (US)

( * ) Notice: Subject to any disclaimer, the term of this patent is extended or adjusted under 35 U.S.C. 154(b) by 59 days.

(21) Appl. No.: 12/804,533

(22) Filed: Jul. 23, 2010

(65) Prior Publication Data

US 2011/0017569 A1   Jan. 27, 2011

Related U.S. Application Data

(60) Provisional application No. 61/227,824, filed on Jul. 23, 2009.

(51) Int. Cl.
*B65G 19/00* (2006.01)
*B60P 1/00* (2006.01)

(52) U.S. Cl. .................. 198/728; 414/509; 414/528

(58) Field of Classification Search .............. 414/509, 414/528; 198/728, 841
See application file for complete search history.

(56) References Cited

U.S. PATENT DOCUMENTS

| 2,199,688 | A |   | 5/1940  | Boldt           |         |
|-----------|---|---|---------|-----------------|---------|
| 2,771,203 | A | * | 11/1956 | Collins et al.  | 414/502 |
| 2,916,169 | A |   | 12/1959 | De Witt         |         |
| 3,051,298 | A | * | 8/1962  | Knight          | 198/834 |
| 4,037,740 | A | * | 7/1977  | Wood et al.     | 414/518 |
| 4,149,642 | A | * | 4/1979  | Schneider       | 414/523 |
| 4,253,791 | A | * | 3/1981  | Van Drie        | 414/528 |
| 4,261,682 | A | * | 4/1981  | Papps et al.    | 414/528 |
| 4,304,516 | A | * | 12/1981 | Schmidt et al.  | 414/328 |
| 4,709,805 | A | * | 12/1987 | Foster          | 198/750.5 |
| 4,741,431 | A | * | 5/1988  | Whitehead       | 198/844.1 |
| 4,844,684 | A |   | 7/1989  | Bradley         |         |
| 5,038,687 | A | * | 8/1991  | St. Laurent et al. | 105/355 |
| 5,104,281 | A |   | 4/1992  | Corvi           |         |
| 5,171,122 | A | * | 12/1992 | Pellegrino      | 414/514 |
| 5,400,974 | A |   | 3/1995  | Musso, Jr. et al. |       |
| 5,803,701 | A | * | 9/1998  | Filiberti et al. | 700/215 |
| 5,902,090 | A | * | 5/1999  | Young et al.    | 414/527 |
| 7,192,239 | B2 | * | 3/2007 | Marmur et al.   | 414/478 |
| 7,293,640 | B1 | * | 11/2007 | Aulick         | 198/817 |
| 7,419,348 | B2 | * | 9/2008 | Byrne           | 414/525.2 |
| 7,766,736 | B2 | * | 8/2010 | Ramp et al.     | 460/16  |

* cited by examiner

*Primary Examiner* — Douglas Hess
(74) *Attorney, Agent, or Firm* — King & Partners, PLC

(57) ABSTRACT

A conveyer assembly for loading and unloading objects from vehicle, the assembly including a platform having at least one slot extending across at least a portion of the platform, at least one conveyor extending at least partially into the slot, wherein the conveyor linearly translates inside the slot and at least one support plate, wherein the support plate is releaseably associable with the conveyor via at least one connector member configured to engage the at least one conveyor in such a way that when the conveyor linearly translates the support plate translates therewith and when the conveyor stops the support plate is secured in place.

20 Claims, 7 Drawing Sheets

US 8,371,434 B2

CONVEYOR ASSEMBLY

CROSS-REFERENCE TO RELATED APPLICATION(S)

This application claims the benefit of U.S. Provisional Application Ser. No. 61/227,824, filed Jul. 23, 2009, entitled "Conveyor Assembly," which is hereby incorporated herein by reference in its entirety, including all references cited therein.

BACKGROUND OF THE INVENTION

1. Field of the Invention

The present invention relates in general to a conveyor assembly and, more particularly, to a vehicular conveyor assembly which facilitates horizontal displacement of loaded pallets into and/or out of a vehicle, such as a delivery van.

2. Background Art

The utilization of pallets for product (e.g., raw materials, consumer goods, foods, etcetera) storage and transportation has been known in the art for years. In particular, a plurality of pallets loaded with product are normally transported from a first facility (e.g., manufacturing facility, warehouse, etcetera) to a second facility (e.g., distribution center, retail store, etcetera) via vehicular means. However, the plurality of pallets must first be loaded into the vehicle prior to being transported. Often times a first pallet is loaded into, for example, the back of a delivery vehicle using a forklift or hi-lo, and a second pallet is subsequently loaded into the back of the delivery vehicle which horizontally displaces the first pallet toward the front of the delivery vehicle. Frequently, a third pallet is subsequently loaded into the back of the delivery vehicle, which then horizontally displaces the first and second pallets toward the front of the delivery vehicle.

This process is repeated until the delivery vehicle is sufficiently loaded. To be sure, such a loading technique is replete with drawbacks including excess wear-and-tear and/or damage to the vehicle, pallets, and/or loaded product, as well as injury, amputation, and/or death to the user from, for example, unnecessarily hazardous exposure to pulleys, ropes, chains, etcetera. Moreover, precise, efficient, and accurate pallet placement within the delivery vehicle is extremely difficult to achieve using the traditional load-and-displace forklift methodology.

Once the plurality of pallets have been loaded and transported to a predetermined location/second facility, they are traditionally unloaded with the assistance of, for example, pallet pullers, ropes, and/or chains, which, similarly to loading the plurality of pallets, is replete with drawbacks including excess wear-and-tear and/or damage to the vehicle, pallets, and/or loaded product, as well as possible injury to the user.

It is therefore an object of the present invention to provide a conveyor assembly for use with a vehicle which remedies one or more of the aforementioned drawbacks and/or complications associated with traditional assemblies and their associated methodologies used for loading and unloading palletized products.

These and other objects of the present invention will become apparent in light of the present specification, claims, and drawings.

SUMMARY OF THE INVENTION

According to an exemplary embodiment, the present invention is directed to a conveyer assembly comprising a platform having at least one slot extending across at least a portion of the platform, at least one conveyor extending at least partially into the slot, wherein the conveyor linearly translates inside the slot and at least one support plate, and wherein the support plate is releaseably associable with the conveyor, the support plate having at least one connector member configured to engage the at least one conveyor in such a way that when the conveyor linearly translates the support plate translates therewith and when the conveyor stops the support plate is secured in place.

In an additional embodiment, the platform includes a plurality of planks arranged side-by-side in a substantially co-planar relationship to one another, wherein adjacent planks are spaced apart from one another to form a plurality of slots.

In accordance with the present disclosure the platform includes sidewalls extending downwardly from the edges of the platform.

According to other exemplary embodiments, the conveyor includes a continuous chain, one continuous chain for each of the slots.

In an alternative embodiment, the conveyor assembly further includes an elongated tubular enclosure disposed below each of the slots, the elongated enclosure sized to receive at least a portion of the continuous chain therein.

In accordance with the present disclosure, the elongated tubular enclosure includes a guide rail extending normally to a top surface of the elongated tubular member for supporting a portion of the continuous chain extending from the elongated tubular enclosure.

In yet another embodiment, the conveyor assembly further includes a drive assembly having: (a) a first sub-assembly comprising a first plurality of gears, wherein each of the first plurality of gears is linearly aligned with and engages one of the continuous chains, the first plurality of gears operatively coupled to a first drive shaft, wherein the first drive shaft is rotatably supported by the platform; (b) a second sub-assembly comprising a second plurality of gears corresponding in number to and linearly aligned with the first plurality of gears, each of the second plurality of gears engaging one of the continuous chains, the second plurality of gears operatively coupled to a second drive shaft, wherein the second drive shaft is rotatably supported by the platform; and (c) wherein the first and second sub-assemblies are spaced apart from one another on opposing ends of the platform.

In an additional embodiment, the first drive shaft is operatively coupled to a motive source.

In accordance with the present disclosure, the first sub-assembly includes at least one guide disposed proximate a gear, wherein the at least one guide is spaced apart from the gear so as to prevent the continuous chain from disassociating with the gear.

In one embodiment, the at least one guide extends from a partition extending from a bottom surface of the platform, wherein the partition includes an aperture for receiving the first drive shaft.

In an additional embodiment, the second sub-assembly includes tensioners positioned on opposing sides of one or more of the gears to selectively vary the amount of tension applied to the continuous chain by the gear.

According to exemplary embodiments, a tensioner includes a collar surrounding the drive shaft and a rod having a selectively adjustable length, the rod extending from the collar, wherein an end of the rod is secured to a sidewall extending downwardly from a bottom surface of the platform.

In an alternative embodiment, the support plate includes a plurality of connector members corresponding to one or more of the slots of the platform.

In accordance with the present disclosure, each of the plurality of connector members extend downwardly from a bottom surface of the support plate, each connector member including a channel having a top plate, two sidewalls, and at least one protrusion extending downwardly into the channel from the top plate, wherein the at least one protrusion contacts the continuous chain when the connector member engages the continuous chain.

In yet another embodiment, the at least one protrusion includes the head of a fastener utilized to secure the channel to the support plate.

In some embodiment, the present disclosure is directed to a conveyer assembly having: (a) a platform including a plurality of planks arranged side-by-side in a substantially co-planar relationship to one another, wherein adjacent planks are spaced apart from one another to form a plurality of slots; (b) a continuous chain for each of the plurality of slots, the continuous chains extending at least partially into the slots, wherein the continuous chains linearly translate inside the slots; and (c) at least one support plate, wherein the support plate is releaseably associable with the continuous chains, the support plate having a plurality of connector members, each connector member configured to engage one of the continuous chains in such a way that when the continuous chains translate the support plate translates therewith and when the continuous chains stop the support plate is secured in place.

In a further embodiment, the conveyor assembly further comprises a drive assembly having: (a) a first sub-assembly comprising a first plurality of gears, wherein each of the first plurality of gears is linearly aligned with and engages one of the continuous chains, the first plurality of gears operatively coupled to a first drive shaft, wherein the first drive shaft is rotatably supported by the platform; (b) a second sub-assembly comprising a second plurality of gears corresponding in number to and linearly aligned with the first plurality of gears, each of the second plurality of gears engaging one of the continuous chains, the second plurality of gears operatively coupled to a second drive shaft, wherein the second drive shaft is rotatably supported by the platform; and (c) wherein the first and second sub-assemblies are spaced apart from one another on opposing ends of the platform.

In accordance with the present disclosure, the first drive shaft is operatively coupled to a motive source.

In yet another embodiment, the present invention is directed to a conveyer assembly in combination with a vehicle, the vehicle having a cargo space, the combination comprising: (a) a platform including a plurality of slats arranged side-by-side in a substantially co-planar relationship to one another to form at least a portion of the floor of the cargo space, wherein adjacent slats are spaced apart from one another to form a plurality of slots; (b) a continuous chain for each of the plurality of slots, the continuous chains extending at least partially into the slots, wherein the continuous chains linearly translate inside the slots; and (c) at least one support plate, wherein the support plate is releaseably associable with the continuous chains, the support plate having a plurality of connector members, each connector member configured to engage one of the continuous chains in such a way that when the continuous chains translate the support plate translates therewith and when the continuous chains stop the support plate is secured in place.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be understood that the invention is not necessarily limited to the particular embodiments illustrated herein.

DETAILED DESCRIPTION OF THE INVENTION

Figure 1:
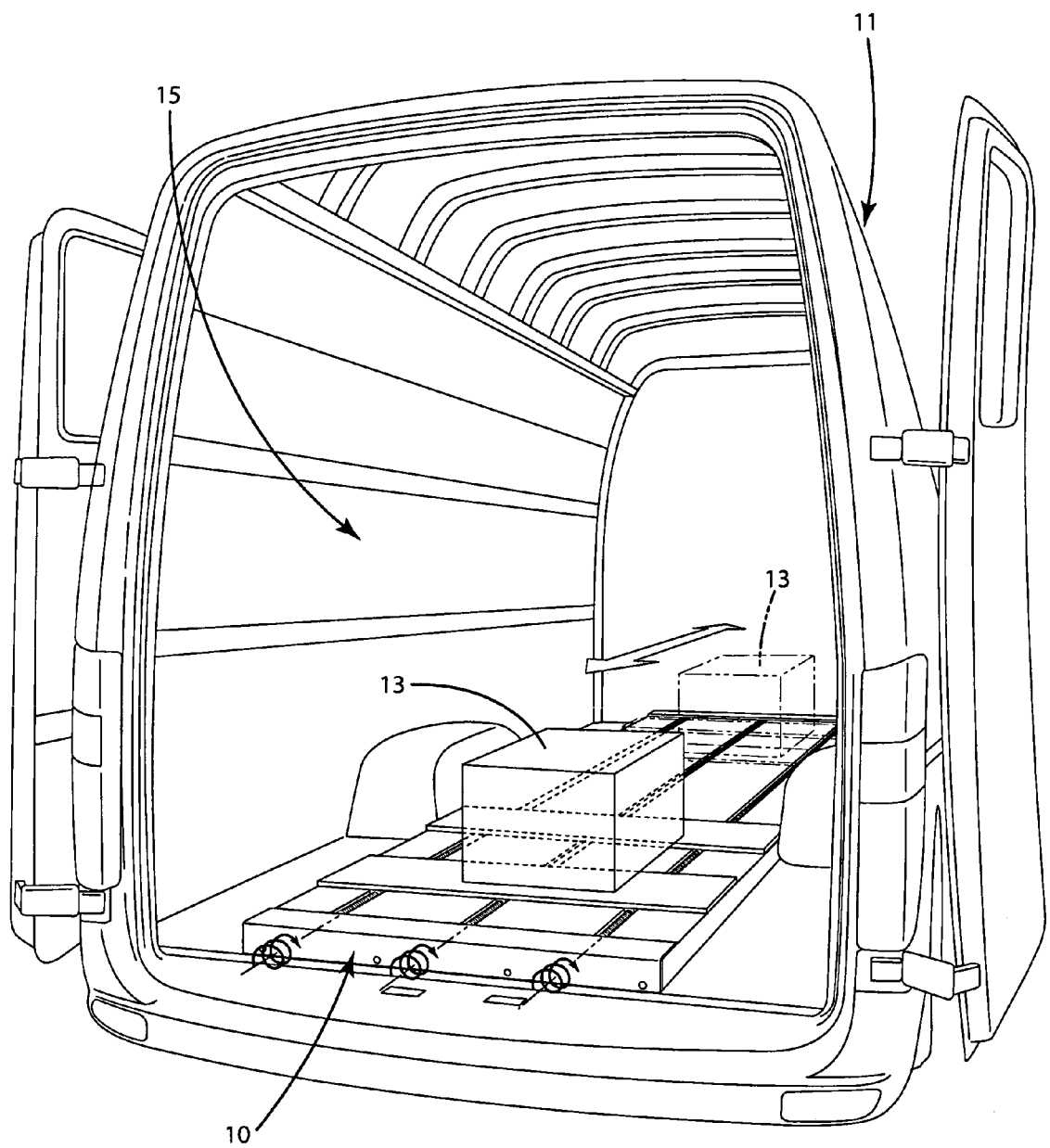
FIG. 1 of the drawings is a perspective view of an exemplary environment for utilizing the present invention showing a conveyor assembly disposed within a vehicle.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Referring now to the drawings, and more particularly to FIG. 1, a perspective view of an exemplary environment for practicing the present invention is shown which includes conveyor assembly 10 disposed within vehicle 11. More specifically, conveyor assembly 10 is shown disposed within cargo space 15 of vehicle 11. Conveyor assembly 10 is utilized to easily load and unload pallets 13 from cargo space 15 of vehicle 11. It will be understood that conveyor assembly 10 may be installed on the floor of cargo space 15 or integrally combined into vehicle 11 as a portion the floor of cargo space 15.

Figure 2:
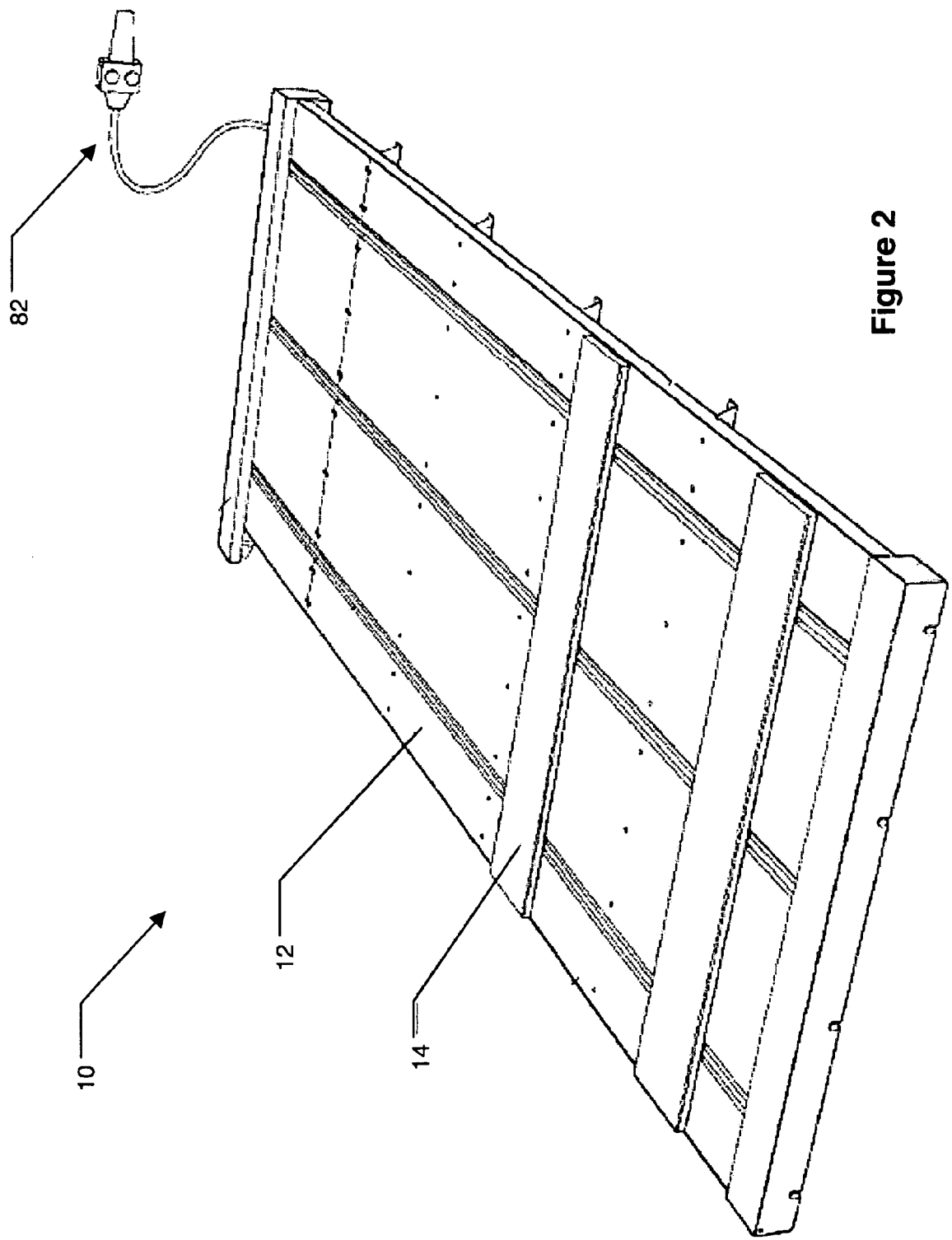
FIG. 2 of the drawings is a perspective view of a portion of an exemplary conveyor assembly.

Referring to FIG. 2, a perspective view of conveyor assembly 10 is shown. Conveyor assembly 10 preferably includes platform 12 and support plates 14. In one embodiment of the invention, support plates 14 slidably translate along platform 12 and supportingly receive objects such as pallets.

Figure 3:
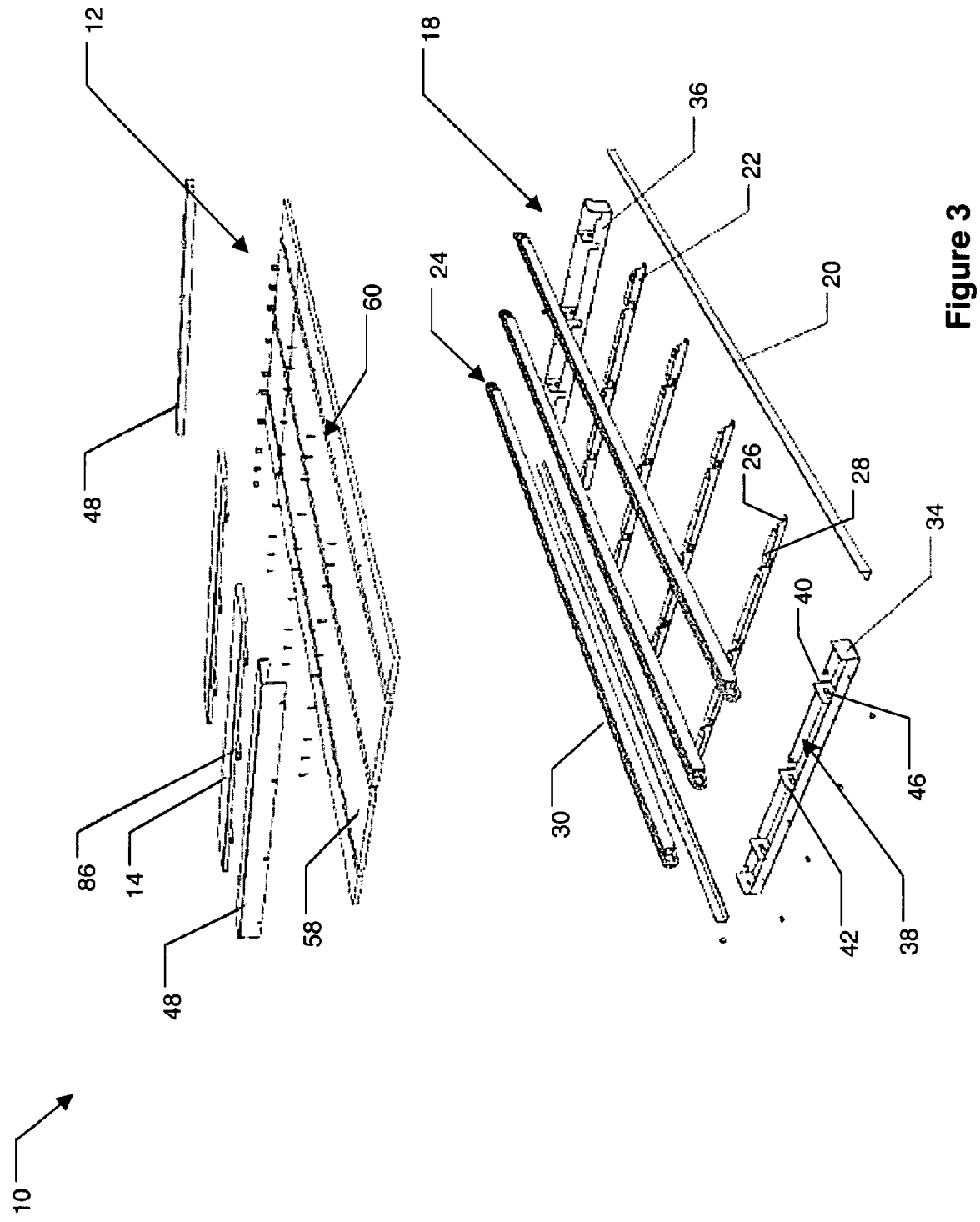
FIG. 3 of the drawings is an exploded view of the conveyor assembly of FIG. 2.

FIG. 3 is an exploded view of conveyor assembly 10. Platform 12 preferably comprises frame 18 that includes two outer L-shaped brackets 20 spaced apart from one another by a plurality of struts 22 extending between L-shaped brackets 20. Each of struts 22 includes a plurality of notches for receiving a plurality of elongated tubular members 24 which are described in greater detail below. In one embodiment, struts 22 are fabricated from steel bent into a Z-shaped configuration having an upper flange 26 and lower flange 28 extending oppositely from upper flange 26. It will be understood that the upper and lower flanges are substantially parallel to one another. Lower flanges 28 of struts 22 may be utilized to connect platform 12 to the floor of a vehicle.

Figure 4:
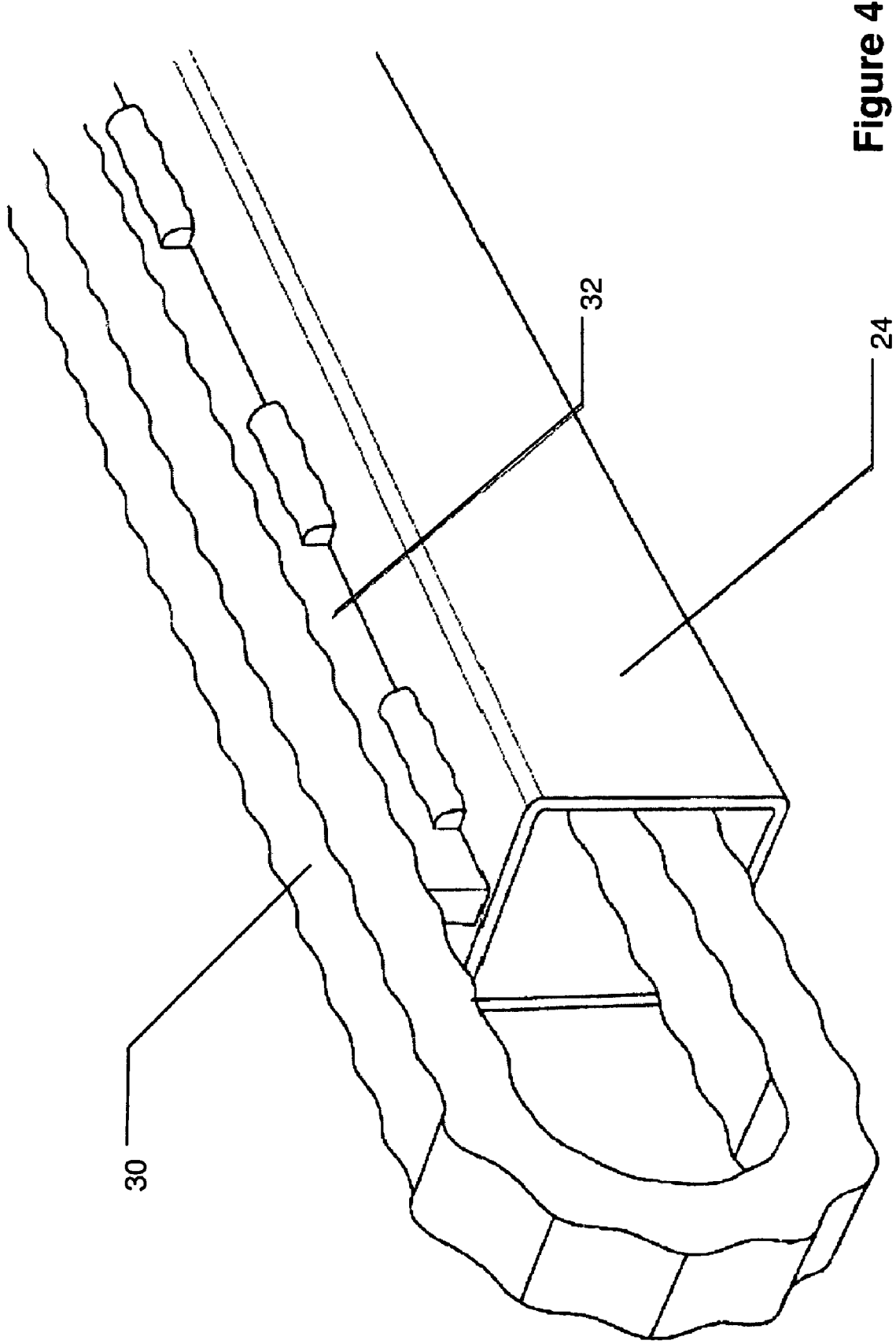
FIG. 4 of the drawings is a perspective view of an elongated tubular member in combination with a continuous chain.

Referring briefly to FIG. 4, in one embodiment, elongated tubular members 24 include square tubular members. Moreover, elongated tubular members 24 may be fabricated from one and one-half inch square tubing with a fourteen-gauge wall. Each elongated tubular member 24 extends along the length of frame 18 and is sized to enclose at least a portion of a conveyor 30. Non-limiting examples of conveyors 30 include belts, chains, cords, and the like. Elongated tubular members 24 each include guide track 32 extending normally from an upper surface of elongated tubular members 24. Guide track 32 is configured to slidably support the portion of conveyor 30 that extends circularly around the outside of elongated tubular member 24. In one embodiment, guide track 32 is preferably fabricated from one-quarter inch by one half-inch cold rolled flat stock welded to the top surface of elongated tubular member 24.

In one embodiment, conveyor assembly 10 includes three elongated tubular members 24 in combination with three conveyors 30, which in this embodiment includes continuous chains. Each of the continuous chains extends at least partially through a corresponding elongated tubular member 24 and along the top of guide track 32 of elongated tubular member 24 in a circular configuration. Moreover, in one embodiment, the continuous chains include number forty chains.

Referring once again to FIG. 3, frame 18 also includes first and second U-shaped channels 34 and 36 disposed at opposing ends of frame 18. Each of U-shaped channels 34 and 36 is attached to the ends of L-shaped brackets 20. Each inner sidewall 38 of U-shaped channels 34 and 36 includes a plurality of notches 40 for receiving and supporting the ends of elongated tubular members 24. Additionally, U-shaped channels 34 and 36 include a plurality of partitions 42 that divide U-shaped channels 34 and 36 into a plurality of compartments. Each partition 42 includes an aperture 46 for receiving a drive shaft therethrough.

Figure 5:
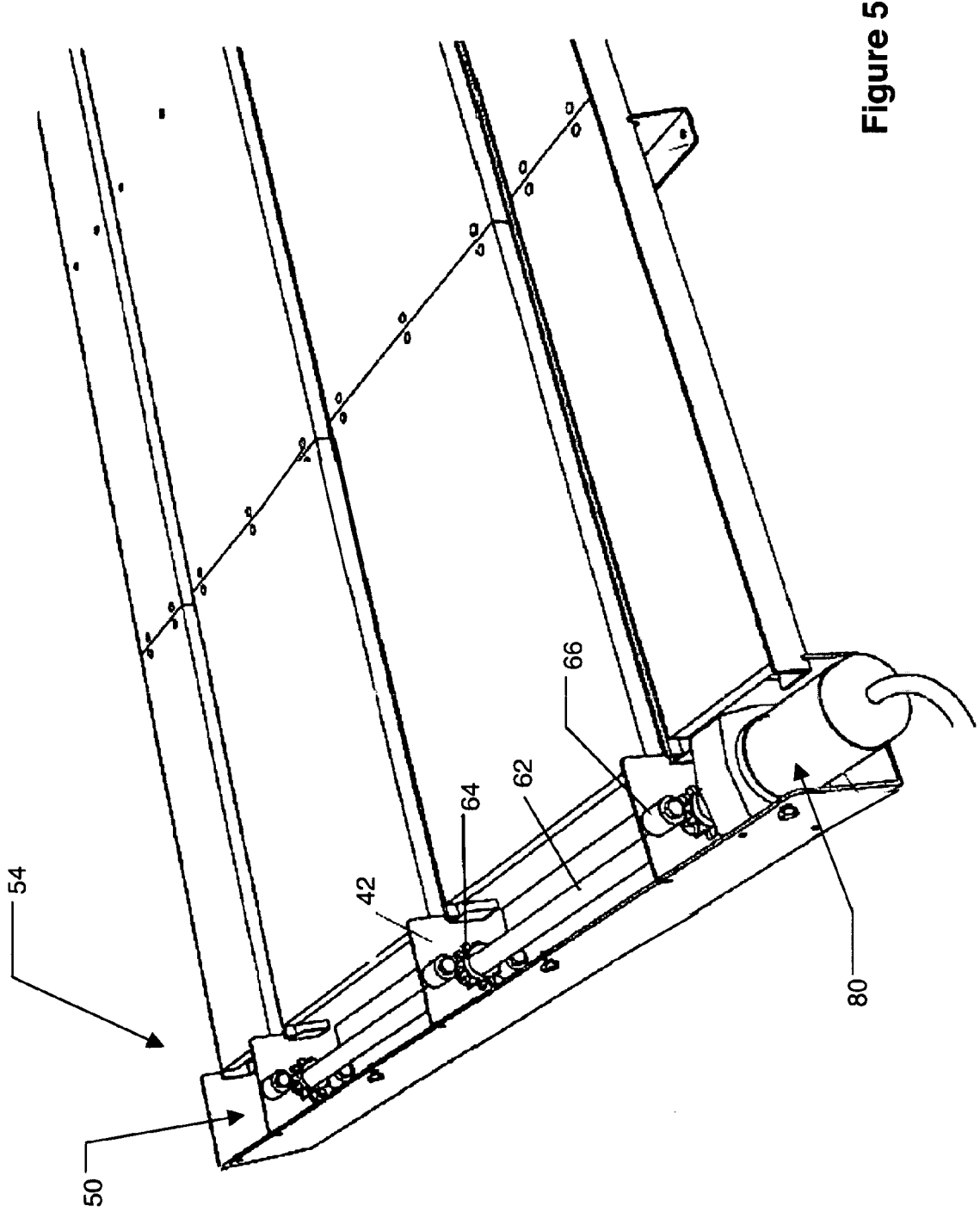
FIG. 5 of the drawings is a perspective view of a first sub-assembly of a drive assembly of the conveyor assembly.
Figure 6:
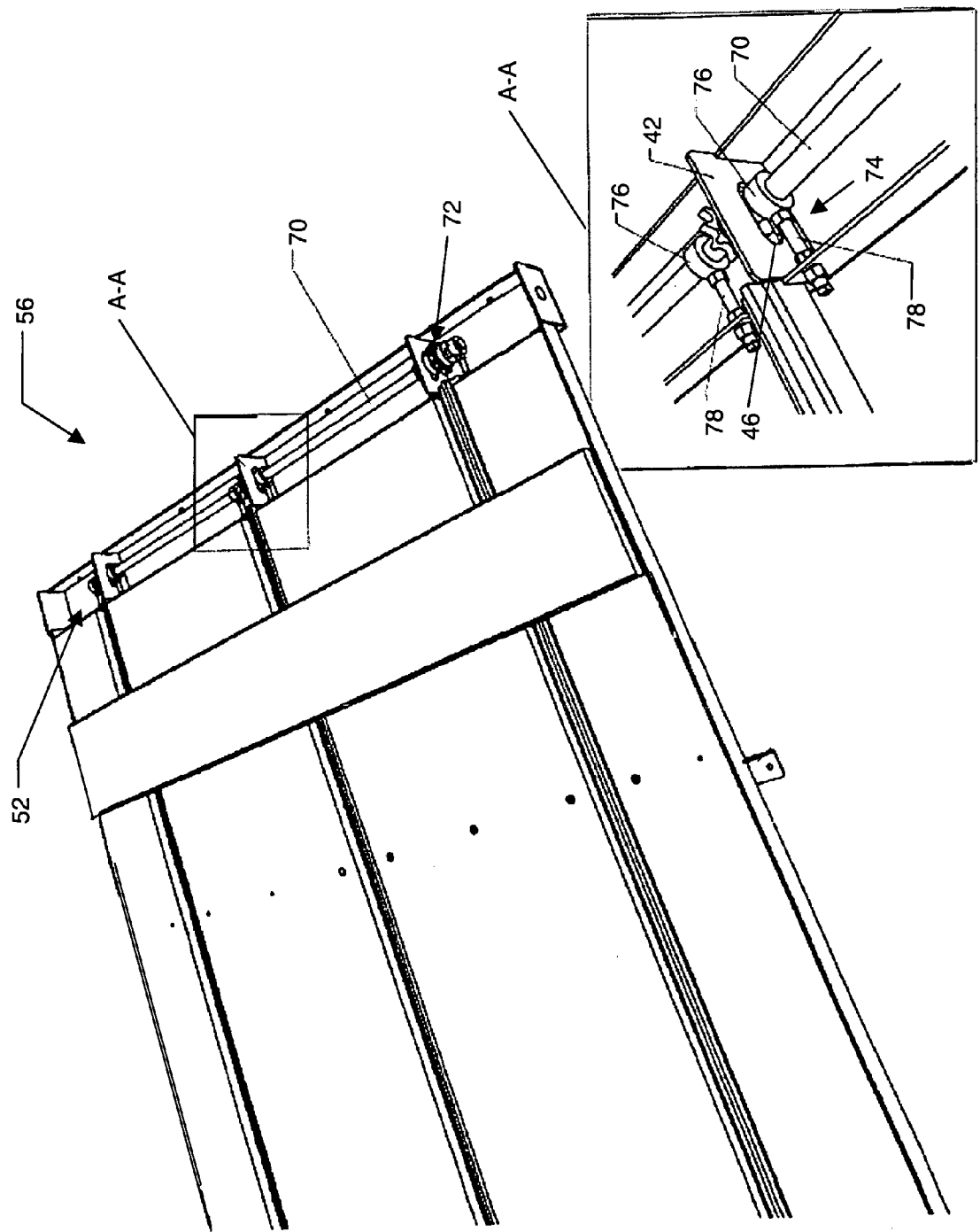
FIG. 6 and Section View A-A of the drawings is a perspective view of a second sub-assembly of the drive assembly of the conveyor assembly.

Frame 18 also includes two caps 48 cooperating with U-shaped channels 34 and 36 to form first enclosure 50 (FIG. 5) and second enclosure 52 (FIG. 6). Enclosures 50 and 52 house separate portions of a drive assembly that in one embodiment includes first sub-assembly 54 and second sub-assembly 56.

In accordance with the present disclosure, platform 12 may be constructed from a plurality of slats 58 arranged side-by-side in co-planar relation to one another. Slats 58 are attached to upper flanges 26 of struts 22 via fasteners. Adjacent slats 58 are spaced apart from one another to form slots 60. It will be understood that each slot 60 is capable of receiving at least a portion of conveyor 30.

Referring now to FIG. 5, first sub-assembly 54 generally includes first drive shaft 62 and a plurality of gears 64 or sprockets corresponding to the number of conveyors 30. Gears 64 are slidably disposed on first drive shaft 62 and may be welded into place on first drive shaft 62. Gears 64 are spaced apart along first drive shaft 62 such that gears 64 are disposed proximate partitions 42 of first enclosure 50. Moreover, each partition 42 of first enclosure 50 may include two guides 66 disposed above and below each gear 64. Guides 66 are spaced apart from gears 64 and ensure conveyors 30 remain operatively connected to gears 64. Guides 66 may be fabricated from a resilient material such as a plastic and in one particular embodiment, nylon. It will be understood that apertures 46 (FIG. 3) of partitions 42 of first enclosure 50 are substantially circular and prevent first drive shaft 62 from unwanted longitudinal movement.

Referring now to FIG. 6 and section view A-A collectively, similarly to first sub-assembly 54, second sub-assembly 56 generally includes second drive shaft 70 and a plurality of gears 64 or sprockets corresponding to the number of conveyors 30. Gears 64 are slidably disposed on second drive shaft 70 and may be welded into place on second drive shaft 70. Gears 64 are disposed along second drive shaft 70 such that gears 64 are located proximate partitions 42 of second enclosure 52. It will be understood that apertures 46 of partitions 42 of second enclosure 52 are elongated and allow second drive shaft 70 to move longitudinally to vary the tension applied to conveyors 30.

As such, second sub-assembly 56 may include tensioners 74 disposed on each side of gears 64. Tensioners 74 include collar 76 and adjustable rod 78. Collar 76 surrounds second drive shaft 70 while allowing for free rotation of second drive shaft 70. The end of adjustable rod 78 is securely connected to a portion of second enclosure 52. It will be understood that as the length of adjustable rod 78 is extended, greater tensional force is applied to conveyor 30. Conversely, as the length of adjustable rod 78 is shortened, a lesser amount of tensional force is applied to conveyor 30.

It will be understood that both first and second drive shafts 62 and 70 are inserted through bushings (not shown). The bushings are pressed in place within enclosures 50 and 52. The bushings rotatably support drive shafts 62 and 70. Additionally, shaft collars (not shown) may be utilized to hold first and second drive shafts 62 and 70 in place.

Conveyor assembly 10 may include motive source 80, which in one embodiment includes an electric motor. In greater detail, motive source 80 may include a conventional ATV winch that is readily available from a variety of commercial sources. The cable is removed from the winch and the drum is modified to couple to first drive shaft 62. Functionally, the motor and gearbox of the ATV winch operate on an electrical current of approximately 12 volts, draw approximately 50 amps, and rotate about 20 rpm via a 152 to 1 planetary gear reduction. With such a configuration motive source 80 is capable of acting as a brake when the electrical potential is removed or in an open circuit state. Motive source 80 may be operatively coupled to control mechanism 82 (FIG. 1) such as a control pad. It will be understood that control mechanism 82 may be wirelessly coupled to motive source 80.

In an additional embodiment, control mechanism 82 may be mounted to the back door of the vehicle. Control mechanism 82 is a 2-button control with momentary contacts that enable bi-directional translation of conveyors 30.

Battery connection wiring runs from the vehicle's 12-volt battery through an inline fuse mounted proximate the battery of the vehicle and then to control mechanism 82. Control mechanism 82 is in electrical communication with motive source 80. The negative wire is bonded to the vehicle's body to utilize its grounding system. All wiring is secured and housed in accordance with traditional automotive electrical code.

An inline-style fuse with a watertight holder may be used with the conveyor assembly, or, alternatively, the vehicle's terminal bus may be utilized. A 60-amp fuse within 12" of the battery is preferred.

Figure 7:
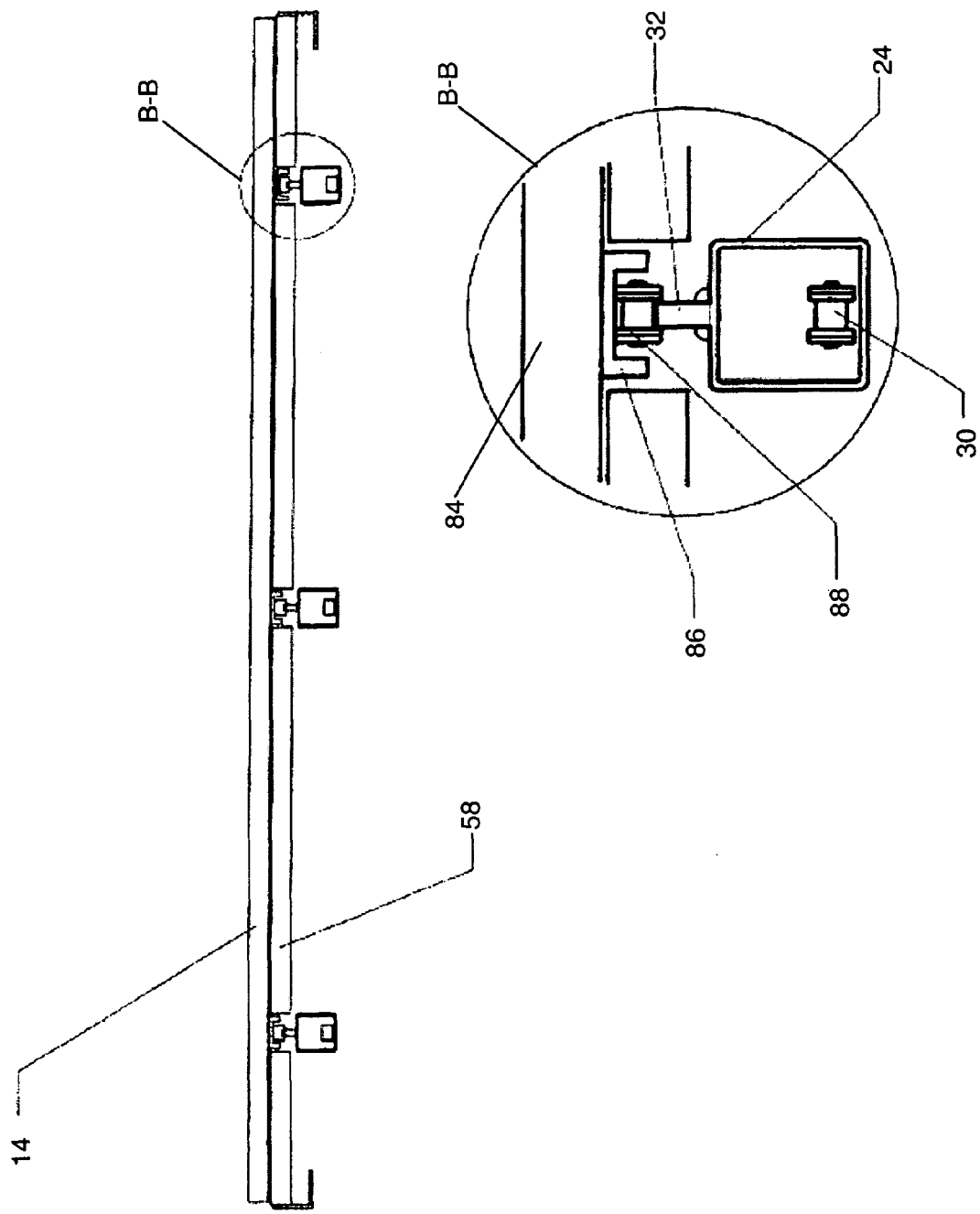
FIG. 7 and Section View B-B of the drawings is a perspective view of a support plate in combination with a platform.

FIG. 7 and section view B-B collectively show support plates 14. Each support plate 14 includes body 84 having a plurality of connector members 86 that may correspond in number to slots 60 of platform 12. Connector members 86 include a U-shaped channel extending the width of support plate 14 such that when support plates 14 are joined to platform 12, support plates 14 are disposed perpendicularly to slats 58 of platform 12. Connector members 86 are securely connected to the bottom surface of support plate 14 via one or more fasteners. It will be understood that heads 88 of the fasteners extend at least partially into the U-shaped channel. It will further be understood that heads 88 of the fasteners act as a mechanical engagement point between support plates 14 and conveyor 30 when connector members 86 are disposed within slots 60. Moreover, connector members 86 suspend support plates 14 at a predetermined distance above platform 12 to permit slidable translation of support plates 14 along platform 12.

In operation, support plates 14 are joined to platform 12 by inserting connector members 86 into slots 60 engaging heads 88 of the fasteners with conveyors 30. After heads 88 of the fasteners are engaged with conveyors 30, engagement of motive source 80 causes conveyors 30 to translate support plates 14 along platform 12. Objects may be translated along the length of platform 12 by placing the objects onto one or more support plates 14.

Generally, the user will preferably back up the associated vehicle to a delivery area so a forklift can approach its back door. The user places two support plates 14 crossway on conveyors 30 to accommodate the pallet size, usually about 36" apart. It will be understood that properly spacing the pallet on the support plates 14 evenly distributes the weight of the pallet onto each of conveyors 30. The forklift driver then sets the pallet down onto support plates 14, and then removes the forks and retreats from the back of the vehicle. The user utilizes control mechanism 82 to move the pallet forward to make room for the next pallet. The process can now be repeated with the second set of support plates 14. It will be understood that a 10' long vehicle can usually haul three pallets. The last pallet can be set in without support plates 14 because the pallet does not need to move. The user then preferably straps down each pallet with 2" wide ratchet straps to the side of the van on the provided hook rails. The user may go to the next stop to unload the pallets in the reverse manner.

The foregoing drawings and description merely explain and illustrate the present invention, and the present invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A conveyer assembly, comprising:
   a platform having at least one slot extending across at least a portion of the platform, wherein the platform comprises a frame having a pair of L-shaped brackets spaced apart from each other along a longitudinal axis of the platform, a plurality of struts positioned between the L-shaped brackets spaced apart from each other along a latitudinal axis of the platform, and a pair of U-shaped end brackets spaced apart from each other along the latitudinal axis of the platform, wherein the pair of L-shaped brackets and the pair of U-shaped end brackets collectively define an outer peripheral geometry of the frame;
   at least one conveyor extending at least partially into the slot, wherein the conveyor linearly translates inside the slot; and
   at least one support plate positioned above the platform, wherein the support plate is releaseably associable with the conveyor via at least one connector member configured to engage the conveyor in such a way that when the conveyor linearly translates the support plate translates therewith and when the conveyor stops the support plate is secured in place.

2. The conveyer assembly according to claim 1, wherein the platform includes a plurality of slats arranged side-by-side in a substantially co-planar relationship to one another, wherein adjacent slats are spaced apart from one another to form a plurality of slots.

3. The conveyer assembly according to claim 2, wherein the platform includes sidewalls extending downwardly from the edges of the platform.

4. The conveyer assembly according to claim 2, wherein the at least one conveyor includes a continuous chain for each of the slots.

5. The conveyer assembly according to claim 4, further comprising an elongated tubular member disposed below each of the slots, the elongated enclosure sized to receive at least a portion of a continuous chain extending therethrough.

6. The conveyer assembly according to claim 5, wherein the elongated tubular member includes a guide rail extending normally to a top surface of the elongated tubular member for supporting a portion of the continuous chain extending from the elongated tubular member.

7. The conveyer assembly according to claim 4, further comprising a drive assembly having:
   a first sub-assembly comprising a first plurality of gears, wherein each of the first plurality of gears is linearly aligned with one of the slots and engages one of the continuous chains, the first plurality of gears operatively coupled to a first drive shaft, wherein the first drive shaft is rotatably supported by the platform;
   a second sub-assembly comprising a second plurality of gears corresponding in number to and linearly aligned with the first plurality of gears, each of the second plurality of gears engaging one of the continuous chains, the second plurality of gears operatively coupled to a second drive shaft, wherein the second drive shaft is rotatably supported by the platform; and
   wherein the first and second sub-assemblies are spaced apart from one another on opposing ends of the platform.

8. The conveyer assembly according to claim 7, wherein the first drive shaft is operatively coupled to a motive source.

9. The conveyer assembly according to claim 7, wherein the first sub-assembly includes at least one guide disposed proximate each of the first plurality of gears, wherein the at least one guide is spaced apart from the gear so as to prevent the continuous chain from disassociating with the gear.

10. The conveyer assembly according to claim 9, wherein the at least one guide extends from a partition extending from a bottom surface of the platform, wherein the partition includes an aperture for receiving the first drive shaft.

11. The conveyer assembly according to claim 7, wherein the second sub-assembly includes tensioners positioned on opposing sides of each of the second plurality of gears to selectively vary the amount of tension applied to the continuous chain by the gear.

12. The conveyer assembly according to claim 11, wherein a tensioner includes a collar that surrounds the drive shaft and a rod having a selectively adjustable length, the rod extending from the collar, wherein an end of the rod is secured to a sidewall extending downwardly from a bottom surface of the platform.

13. The conveyer assembly according to claim 2, wherein the support plate includes at least one connector member corresponding to two or more slots of the platform.

14. The conveyer assembly according to claim 13, wherein the at least one connector member extends downwardly from a bottom surface of the support plate, the connector member including a channel having a top plate, two sidewalls, and at least one protrusion extending downwardly into the channel from the top plate, wherein the at least one protrusion contacts a continuous chain when the connector member engages the continuous chain.

15. The conveyer assembly according to claim 14, wherein the at least one protrusion includes a head of a fastener utilized to secure the channel to the support plate.

16. A conveyer assembly, comprising:
a platform including a plurality of slats arranged side-by-side in a substantially co-planar relationship to one another, wherein adjacent slats are spaced apart from one another to form a plurality of slots, wherein the platform comprises a frame having a pair of L-shaped brackets spaced apart from each other along a longitudinal axis of the platform, a plurality of struts positioned between the L-shaped brackets spaced apart from each other along a latitudinal axis of the platform, and a pair of U-shaped end brackets spaced apart from each other along the latitudinal axis of the platform, wherein the pair of L-shaped brackets and the pair of U-shaped end brackets collectively define an outer peripheral geometry of the frame;
a continuous chain for each of the plurality of slots, the continuous chains extending at least partially into the slots, wherein the continuous chains linearly translate inside the slots; and
at least one support plate, wherein the support plate is releaseably associable with the continuous chains via a plurality of connector members, each connector member configured to engage one of the continuous chains in such a way that [Ethel] when the continuous chains translate, the support plate translates therewith, and when the continuous chains stop, the support plate is secured in place.

17. The conveyer assembly according to claim 16, further comprising a drive assembly having:
a first plurality of gears, wherein each of the first plurality of gears is linearly aligned with one of the slots and engages one of the continuous chains, the first plurality of gears operatively coupled to a first drive shaft, wherein the first drive shaft is rotatably supported by the platform;
a second sub-assembly comprising a second plurality of gears corresponding in number to and linearly aligned with the first plurality of gears, each of the second plurality of gears engaging one of the continuous chains, the second plurality of gears operatively coupled to a second drive shaft, wherein the second drive shaft is rotatably supported by the platform; and
wherein the first and second sub-assemblies are spaced apart from one another on opposing ends of the platform.

18. The conveyer assembly according to claim 17, wherein the first drive shaft is operatively coupled to a motive source.

19. A conveyer assembly in combination with a vehicle, the vehicle having a cargo space and a pair of rear access doors, the combination comprising:
a platform including a plurality of slats arranged side-by-side in a substantially co-planar relationship to one another to form at least a portion of the floor of the cargo space proximate the pair of rear access doors, wherein adjacent slats are spaced apart from one another to form a plurality of slots, wherein the platform further includes a frame having a pair of L-shaped brackets spaced apart from each other along a longitudinal axis of the platform, a plurality of struts positioned between the L-shaped brackets spaced apart from each other along a latitudinal axis of the platform, and a pair of U-shaped end brackets spaced apart from each other along the latitudinal axis of the platform, wherein the pair of L-shaped brackets and the pair of U-shaped end brackets collectively define an outer peripheral geometry of the frame;
a continuous chain for each of the plurality of slots, the continuous chains extending at least partially into the slots, wherein the continuous chains linearly translate inside the slots; and
at least one support plate, wherein the support plate is releaseably associable with the continuous chains via a plurality of connector members, each connector member configured to engage one of the continuous chains in such a way that when the continuous chains translate, the support plate translates therewith, and when the continuous chains stop, the support plate is secured in place.

20. The combination according to claim 19, further comprising a drive assembly having:
a first sub-assembly comprising:
a first plurality of gears, wherein each of the first plurality of gears is linearly aligned with one of the slots and engages one of the continuous chains, the first plurality of gears operatively coupled to a first drive shaft, wherein the first drive shaft is rotatably supported by the platform;
a second sub-assembly comprising a second plurality of gears corresponding in number to and linearly aligned with the first plurality of gears, each of the second plurality of gears engaging one of the continuous chains, the second plurality of gears operatively coupled to a second drive shaft, wherein the second drive shaft is rotatably supported by the platform;
wherein the first and second sub-assemblies are spaced apart from one another on opposing ends of the platform; and
wherein the first drive shaft is operatively coupled to a motive source in electrical connection with a battery of the vehicle.

* * * * *